US012322194B2

(12) United States Patent
Shen et al.

(10) Patent No.: US 12,322,194 B2
(45) Date of Patent: Jun. 3, 2025

(54) SYSTEM AND METHOD FOR DETERMINING CHARACTERISTIC CELLS BASED ON IMAGE RECOGNITION

(71) Applicants: V5 TECHNOLOGIES CO., LTD., Hsinchu (TW); Taipei Veterans General Hospital, Taipei (TW)

(72) Inventors: Tzu-Kuei Shen, Hsinchu (TW); Linda Siana, Hsinchu (TW); Guang-Hao Suen, Hsinchu (TW); Liang-Wei Sheu, Hsinchu (TW); Chien-Ting Yang, Hsinchu (TW); Yuh-Min Chen, Taipei (TW); Heng-sheng Chao, Taipei (TW); Chung-Wei Chou, Taipei (TW); Tsu-Hui Shiao, Taipei (TW); Yi-Han Hsiao, Taipei (TW); Chi-Lu Chiang, Taipei (TW)

(73) Assignees: V5MED INC., Zhubei (TW); TAIPEI VETERANS GENERAL HOSPITAL, Taipei (TW)

( * ) Notice: Subject to any disclaimer, the term of this patent is extended or adjusted under 35 U.S.C. 154(b) by 407 days.

(21) Appl. No.: 18/088,988

(22) Filed: Dec. 27, 2022

(65) Prior Publication Data
US 2024/0062563 A1  Feb. 22, 2024

(30) Foreign Application Priority Data
Aug. 19, 2022  (TW) .................................. 111131295

(51) Int. Cl.
G06K 9/00 (2022.01)
A61K 35/12 (2015.01)
G06T 7/00 (2017.01)
G06V 20/69 (2022.01)

(52) U.S. Cl.
CPC .......... G06V 20/693 (2022.01); G06T 7/0012 (2013.01); G06V 20/698 (2022.01);
(Continued)

(58) Field of Classification Search
CPC ........... G06V 20/69; A61K 35/12; G06K 9/00
(Continued)

(56) References Cited

U.S. PATENT DOCUMENTS 7,226,788 B2 *  6/2007  De La Torre-Bueno .................... G01N 1/31
                                                                                                        382/128
9,784,666 B2    10/2017  Mai et al.
(Continued)

FOREIGN PATENT DOCUMENTS

CN    108982500 A    12/2018
CN    109034208 A    12/2018
(Continued)

OTHER PUBLICATIONS

Identification of a Novel Cell Type in Peripheral Lymphoid Organs of Mice I. ~--Iorphology, Quantitation, Tissue Distribution* by Ralph M. Steinman$ and Zanvil A. Cohn (Year: 1973).*

Primary Examiner — Seyed H Azarian
(74) Attorney, Agent, or Firm — Birch, Stewart, Kolasch & Birch, LLP

(57) ABSTRACT

A system and a method for determining characteristic cells based on image recognition. In the method, a scanning device capturing a full image of the microslide; a host selecting images that comprise stained blocks from the full image; the host sequentially performing image recognition to recognize stained cells of the images, and determining whether the stained cells comprise the characteristic cells with an AI model; and selecting interested images from the images that comprise the characteristic cells, transforming the coordinate system of the interested images into the original coordinate system of the full image, and employing the scanning device to capture the interested images along the Z axis of the original coordinate system of the full image, thereby obtaining and outputting sets of pictures. The pres- (Continued)

ent invention can quickly determine whether there are characteristic cells in the tissue under test, so as to provide a diagnostic reference for doctors.

7 Claims, 3 Drawing Sheets

(52) U.S. Cl.
CPC ............... *G06T 2207/10056* (2013.01); *G06T 2207/30024* (2013.01)

(58) Field of Classification Search
USPC ....... 382/100, 103, 106, 128–134, 154, 156, 382/165, 168, 173, 181, 199, 219, 224, 382/254, 276, 286–291, 321; 378/4, 21, 378/23
See application file for complete search history.

(56) References Cited

U.S. PATENT DOCUMENTS

2016/0083681 A1 3/2016 Tavana et al.
2021/0158521 A1* 5/2021 Shaked ................. G06T 7/0012
2022/0058369 A1* 2/2022 Alahmari .............. G06F 18/285
2022/0101519 A1* 3/2022 Yip ........................ G06N 3/084
2022/0282202 A1* 9/2022 Wagner ............. B01L 3/502761
2023/0127698 A1* 4/2023 Dave .................... G06V 20/698
2023/0420133 A1* 12/2023 Zalah .................... G06T 7/0014

FOREIGN PATENT DOCUMENTS

| | | |
|---|---|---|
| CN | 111458279 A | 7/2020 |
| CN | 111527519 A | 8/2020 |
| CN | 113167714 A | 7/2021 |
| CN | 113454458 A | 9/2021 |
| CN | 113508290 A | 10/2021 |
| CN | 113705318 A | 11/2021 |
| CN | 114152610 A | 3/2022 |
| EP | 0 592 997 A2 | 4/1994 |
| TW | I687898 B | 3/2020 |
| TW | 202142856 A | 11/2021 |
| TW | I753448 B | 1/2022 |
| TW | 202217838 A | 5/2022 |
| WO | WO 2018/196335 A1 | 11/2018 |

* cited by examiner

SYSTEM AND METHOD FOR DETERMINING CHARACTERISTIC CELLS BASED ON IMAGE RECOGNITION

This application claims priority of application Ser. No. 11/131,295 filed in Taiwan on 19 Aug. 2022 under 35 U.S.C. § 119; the entire contents of all of which are hereby incorporated by reference.

BACKGROUND OF THE INVENTION

Field of the Invention

The present invention relates to a method for determining cells, particularly to a system and a method for determining characteristic cells based on image recognition.

Description of the Related Art

In cell detection, cells are placed in a detection solution. The liquid to be tested containing cells is made into a microslide containing a specimen. The microslide is placed under a microscope. At high magnification, the image of the specimen is magnified and captured. Then, the computer displays the captured image for inspection.

For example, under a 20× objective lens, about 3969 images are captured for each specimen, and the images are not repeated. The number of images captured will vary when the magnification of the objective lens varies. In other words, the specimen is divided into 3969 small blocks, and an image is captured once for each block. In the current method for determining specific cells in a specimen, an inspector (e.g., a doctor or an examiner) manually enlarges the images of these blocks on a computer and then determines whether each cell is abnormal. However, there is more than one type of cells in the specimen, and there may be thousands of cells of each type. Manual inspection of 3,969 images is not only time-consuming, but also easy to recognize wrong cells when the eyes are tired.

To overcome the abovementioned problems, the present invention provides a system and a method for determining characteristic cells based on image recognition, so as to solve the afore-mentioned problems of the prior art.

SUMMARY OF THE INVENTION

The primary objective of the present invention is to provide a system and a method for determining characteristic cells based on image recognition, which determine that the stained blocks of a stained tissue solution includes characteristic cells with an artificial intelligence (AI) model, selects interested images, transforms the coordinate system of the interested images into an original coordinate system, and captures the interested images along the Z axis of the original coordinate system to obtain the thickness and the depth of field of each interested image. Thus, doctors obtain many pictures as diagnostic references.

Another objective of the present invention is to provide a system and a method for determining characteristic cells based on image recognition, which select and capture the interested images along the Z axis instead of capturing each stained block of a full image along the Z axis. Thus, time for determining cells can be reduced.

In order to achieve the objectives, the present invention provides a method for determining characteristic cells based on image recognition, which scans a stained tissue solution on a microslide to recognize the characteristic cells of the stained tissue solution. The method includes: by a scanning device, capturing a full image of the microslide; by a host, receiving the full image and selecting a plurality of images that include stained blocks from the full image with an image processing algorithm; by the host, sequentially performing image recognition on the plurality of images to recognize a plurality of stained cells of the plurality of images, and determining whether the plurality of stained cells include the characteristic cells with an artificial intelligence (AI) model; and selecting a plurality of interested images from the plurality of images that include the characteristic cells, transforming a coordinate system of the plurality of interested images into an original coordinate system of the full image, and employing the scanning device to capture the plurality of interested images along the Z axis of the original coordinate system of the full image, thereby obtaining and outputting a plurality of sets of pictures.

In an embodiment of the present invention, the scanning device includes an electric stage, a microscope, and a camera. The microscope is mounted on the electric stage. The camera is mounted on the microscope. The microslide is mounted on the electric stage.

In an embodiment of the present invention, the microscope scans the microslide and then employs the camera to obtain the full image of the microslide after adjusting a magnification.

In an embodiment of the present invention, the step of determining whether the plurality of stained cells include the characteristic cells with the AI model includes: the AI model determines whether the characteristic cells included by the plurality of stained cells are abnormal when the plurality of stained cells include the characteristic cells; and the AI model determines whether the plurality of stained cells in a next image include the characteristic cells when the plurality of stained cells do not include the characteristic cells.

In an embodiment of the present invention, when the AI model determines that the plurality of stained cells include the characteristic cells, the characteristic cells are scored and the plurality of interested images are selected according to the scores of the characteristic cells.

In an embodiment of the present invention, the characteristic cells are scored according to the sizes and integrity of the characteristic cells.

The present invention also provides a system for determining characteristic cells based on image recognition, which is configured to scan a stained tissue solution on a microslide to recognize the characteristic cells of the stained tissue solution. The system includes a scanning device and a host. The scanning device includes an electric stage, a microscope, and a camera. The microscope is mounted on the electric stage and configured to display a full image of the microslide. The camera is mounted on a lens of the microscope and configured to capture the full image. The host is electrically connected to the camera. The host is configured to receive the full image, select a plurality of images that include stained blocks from the full image with an image processing algorithm, sequentially perform image recognition on the plurality of images to recognize a plurality of stained cells of the plurality of images, determine whether the plurality of stained cells include the characteristic cells with an artificial intelligence (AI) model, select a plurality of interested images from the plurality of images that include the characteristic cells, transform a coordinate system of the plurality of interested images into the original coordinate system of the full image, and employ the scanning device to capture the plurality of interested images along the Z axis of the original coordinate system of the full image, thereby obtaining and outputting a plurality of sets of pictures.

Below, the embodiments are described in detail in cooperation with the drawings to make easily understood the technical contents, characteristics and accomplishments of the present invention.

DETAILED DESCRIPTION OF THE INVENTION

The technical solutions in the embodiments of the present invention will be clearly and completely described below with reference to the drawings in the embodiments of the present invention. Obviously, the described embodiments are part of the embodiments of the present invention, not all of the embodiments. Based on the embodiments of the present invention, all other embodiments obtained by those skilled in the art without making inventive efforts should be included within the scope of the present invention.

It should be understood that, when used in this specification and the scope of the claims, the terms "comprising" and "including" refer to the presence of a stated feature, whole, step, operation, element, and/or component, but does not exclude the presence or addition of one or more other features, wholes, steps, operations, elements, components and/or combinations of these.

It should also be understood that the terms used in the specification of the present invention is only used to describe particular embodiments but not intended to limit the present invention. As used in this specification and the claims, the singular forms "a," "an," and "the" are intended to include the plural forms unless the context clearly dictates otherwise.

It should further be understood that the terms "and/or" used in the specification and the claims refer to any and all possible combinations of one or more of the associated listed items, and include these combinations.

Figure 1:
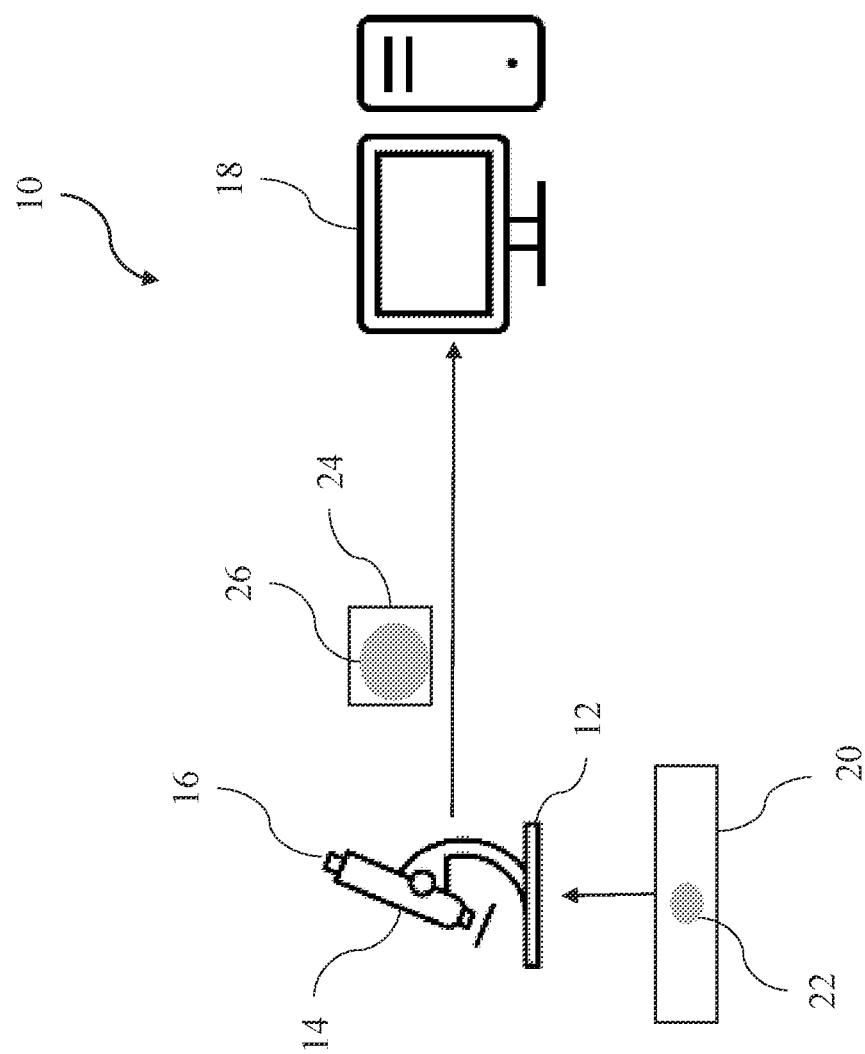
FIG. 1 is a schematic diagram illustrating a system for determining characteristic cells based on image recognition according to an embodiment of the present invention.

The present invention provides a system and a method for determining characteristic cells based on image recognition. Refer to FIG. 1. FIG. 1 is a schematic diagram illustrating a system 10 for determining characteristic cells based on image recognition according to an embodiment of the present invention. The system 10 for determining characteristic cells based on image recognition includes an electric stage 12, a microscope 14, a camera 16, and a host 18. The electric stage 12 can be controlled by a computer to move up and down, left and right, back and forth. The microscope 14 is mounted on the electric stage 12. The camera 16 is mounted on the lens of the microscope 14. The microscope 14 is provided with a microslide 20 thereon. A stained tissue solution 22 is on the microslide 20. The stained tissue solution 22 is dripped with a dye or colored agent, which allows cells to be stained to highlight the location of the cells. The microscope 14 may be an electronic microscope.

The microscope 14 magnifies the image of the stained tissue solution 22. The camera 16 captures the image magnified by the microscope 14. The host 18 is electrically connected to the camera 16. The host 18 receives the images captured by the camera 16 and performs image processing and artificial intelligence (AI) operation on them.

Figure 2:
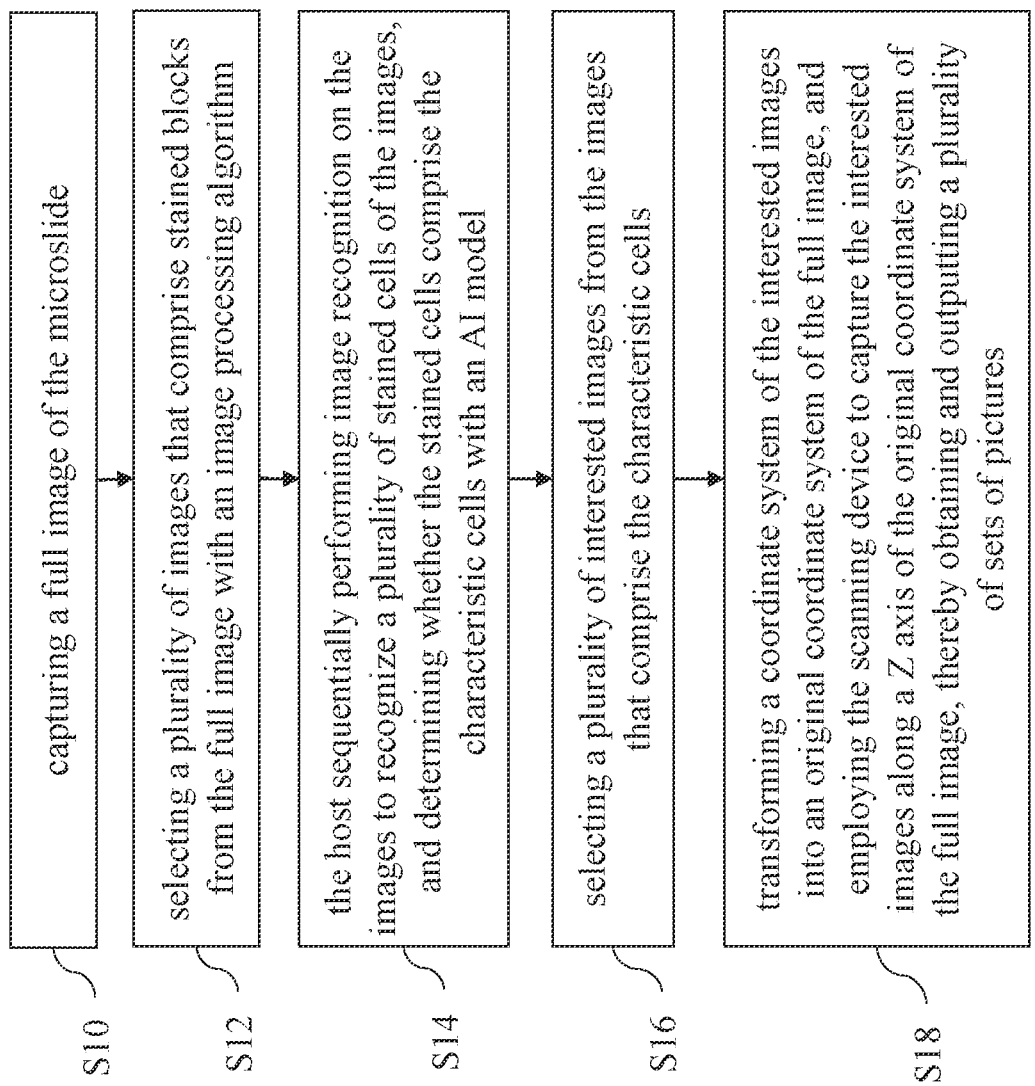
FIG. 2 is a flowchart of a method for determining characteristic cells based on image recognition according to an embodiment of the present invention.

Referring to FIG. 2, the operation of the forgoing components is introduced as follows. FIG. 2 is a flowchart of a method for determining characteristic cells based on image recognition according to an embodiment of the present invention. In Step S10, the camera 16 captures a full image of the microslide 20. In a preferred embodiment, the microscope 14 magnifies the image of the microslide 20 with a magnification (e.g., 10× or 20×) and the camera 16 scans the microslide 20 to obtain a full image. In Step S12, the host 18 receives the full image and selects a plurality of images 24 that include stained blocks 26 from the full image with an image processing algorithm. In Step S14, the host 18 sequentially performs image recognition on the plurality of images to recognize a plurality of stained cells of the plurality of images, and determines whether the plurality of stained cells include the predetermined characteristic cells with an artificial intelligence (AI) model. The AI model determines whether the plurality of stained cells in a next image include the characteristic cells when the plurality of stained cells do not include the characteristic cells. Step S16 is performed when the plurality of stained cells include the characteristic cells. In Step S16, the host 18 selects a plurality of interested images from the plurality of images 24 that include the characteristic cells. In Step S18, the host 18 transforms the coordinate system of the plurality of interested images into the original coordinate system of the full image, and employs the scanning device 16 to capture the plurality of interested images along the Z axis of the original coordinate system of the full image, thereby obtaining and outputting a plurality of sets of pictures.

In Step S16, when the AI model determines that the plurality of stained cells include the characteristic cells, the characteristic cells are scored and the plurality of interested images are selected according to the scores of the characteristic cells. The characteristic cells can be scored according to the sizes and integrity of the characteristic cells. For larger or intact cells, the AI model will give higher scores to them, which helps assist doctors in diagnosis.

For example, the 3900 full images are obtained by scanning the microslide 20 in all. Using the image processing algorithm, the images 24 are selected from the 3900 images that include the stained blocks 26. The stained blocks 26 include stained cells. Then, the AI model determines the images 24 including the characteristic cells and scores them. Assume that there are 200 images 24 including characteristic cells. The 200 images are interested images. According to the scores of the interested images, the interested images with top 20 high scores are selected. The coordinate system of the selected interested images is transformed into the original coordinate system with X and Y coordinates. The camera 16 captures the selected interested images along the Z axis of the original coordinate system to obtain 20 sets of pictures in one time rather than in 20 times. If the image 24 captured along the X and Y axes is a top view, the image captured along the Z axis is a side view. Thus, the image 24 has a depth of field to obtain the thickness of the cell.

Take the Papanicolaou Stain as an example. Its sample under test is sputum. It can be quickly determined whether there are characteristic cells in the sputum with the flowchart of FIG. 2.

Figure 3:
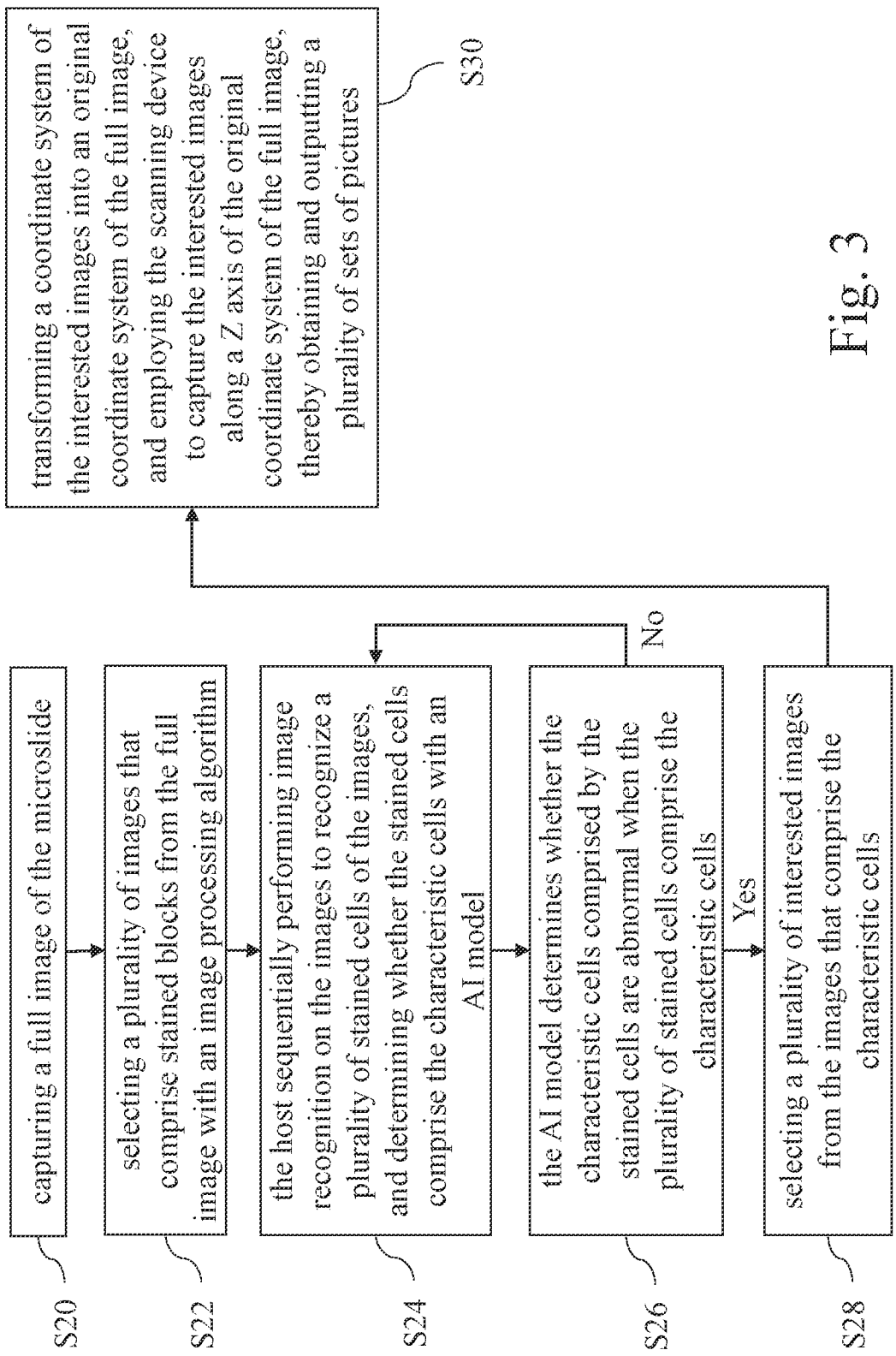
FIG. 3 is a flowchart of a method for determining characteristic cells based on image recognition according to another embodiment of the present invention.

In addition, based on different stained tissue solutions 22, Step further include detailed steps to reduce the operation amount of the AI model. Another embodiment of FIG. 3 is suitable for the Liu Stain and used to determine a tissue fluid near the lymph nodes. Step S20~S22 are identical to Steps S10~S12 in FIG. 2. In Step S24, the host 18 sequentially performs image recognition on the plurality of images 24 to recognize a plurality of stained cells of the plurality of images, and determines whether the plurality of stained cells include the predetermined characteristic cells with the AI model. Step S26 is performed when the plurality of stained cells include the characteristic cells. In Step S26, the AI model determines whether the characteristic cells included by the plurality of stained cells are abnormal. The AI model determines a next image 24 when the characteristic cells are not abnormal. When the plurality of stained cells do not include the characteristic cells, the process directly returns to Step S24 such that the AI model determines whether the plurality of stained cells in a next image 24 include the characteristic cells. Then, in Step S28, the host 18 selects a plurality of interested images from the plurality of images 24 that include the characteristic cells. In Step S30, the host 18 transforms the coordinate system of the plurality of interested images into the original coordinate system of the full image and employs the camera 16 to capture the plurality of interested images along the Z axis of the original coordinate system of the full image, thereby obtaining and outputting a plurality of sets of pictures. Assume that the stained tissue solution 22 is a tissue fluid near the lymph nodes. Thus, Step S24 determines whether the stained blocks include lymphocytes. If the result is no, the stained blocks do not include the abnormal cells of the lymphocytes. The following step of determining the abnormal cells does not need to be performed. If the result is yes, Step S26 is performed to determine whether the lymphocytes are abnormal. For example, the stained tissue solution 22 near the lymph nodes is obtained by using endobronchial ultrasound transbronchial needle aspiration (EBUS-TBNA). It is determined that whether the stained tissue solution 22 includes lymphocytes. If the result is no, the stained blocks are not suitable blocks. The following step of determining the characteristic cells does not need to be performed. If the result is yes, Step S24 determines whether the stained blocks include the characteristic cells and Step S26 determines whether the characteristic cells are abnormal.

In conclusion, the system and the method for determining characteristic cells based on image recognition of the present invention determine that the stained blocks of a stained tissue solution includes characteristic cells with the AI model, selects interested images, transforms the coordinate system of the interested images into an original coordinate system, and captures the interested images along the Z axis of the original coordinate system to obtain the thickness and the depth of field of each interested image. Thus, doctors obtain many pictures as diagnostic references. In addition, the present invention is more suitable for determining the characteristic cells of different cell samples. In the determination of some characteristic cells, the present invention can further determine whether the characteristic cells are abnormal, which can greatly reduce the energy of the examiner or doctor and the operation amount of the host for recognizing characteristic cells.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method for determining characteristic cells based on image recognition, scanning a stained tissue solution on a microslide to recognize the characteristic cells of the stained tissue solution, and the method comprising:
    by a scanning device, capturing a full image of the microslide, wherein the scanning device comprises a microscope and camera;
    by a host, receiving the full image and selecting a plurality of images that comprise stained blocks from the full image with an image processing algorithm;
    by the host, sequentially performing image recognition on the plurality of images to recognize a plurality of stained cells of the plurality of images, and determining whether the plurality of stained cells comprise the characteristic cells with an artificial intelligence (AI) model; and
    selecting a plurality of interested images from the plurality of images that comprise the characteristic cells, transforming a coordinate system of the plurality of interested images into an original coordinate system of the full image, and employing the scanning device to capture the plurality of interested images along a Z axis of the original coordinate system of the full image, thereby obtaining and outputting a plurality of sets of pictures,
    wherein when the AI model determines that the plurality of stained cells comprise the characteristic cells, the characteristic cells are scored and the plurality of interested images are selected according to scores of the characteristic cells, and
    wherein the characteristic cells are scored according to sizes and integrity of the characteristic cells.

2. The method for determining the characteristic cells based on image recognition according to claim 1, wherein the scanning device further comprises an electric stage, the microscope is mounted on the electric stage, the camera is mounted on the microscope, and microslide is mounted on the electric stage.

3. The method for determining the characteristic cells based on image recognition according to claim 2, wherein the microscope scans the microslide and then employs the camera to obtain the full image of the microslide after adjusting a magnification.

4. The method for determining the characteristic cells based on image recognition according to claim 1, wherein the step of determining whether the plurality of stained cells comprise the characteristic cells with the AI model comprises:
    the AI model determines whether the characteristic cells comprised by the plurality of stained cells are abnormal when the plurality of stained cells comprise the characteristic cells; and
    the AI model determines whether the plurality of stained cells in a next image comprise the characteristic cells when the plurality of stained cells do not comprise the characteristic cells.

5. A system for determining characteristic cells based on image recognition, configured to scan a stained tissue solution on a microslide to recognize the characteristic cells of the stained tissue solution, comprising:
    a scanning device comprising an electric stage, a microscope, and a camera, wherein the microscope is mounted on the electric stage and configured to display a full image of the microslide, and the camera is mounted on a lens of the microscope and configured to capture the full image; and a host electrically connected to the camera, wherein the host is configured to receive the full image, select a plurality of images that comprise stained blocks from the full image with an image processing algorithm, sequentially perform image recognition on the plurality of images to recognize a plurality of stained cells of the plurality of images, determine whether the plurality of stained cells comprise the characteristic cells with an artificial intelligence (AI) model, select a plurality of interested images from the plurality of images that comprise the characteristic cells, transform a coordinate system of the plurality of interested images into an original coordinate system of the full image, and employ the scanning device to capture the plurality of interested images along a Z axis of the original coordinate system of the full image, thereby obtaining and outputting a plurality of sets of pictures, wherein when the AI model determines that the plurality of stained cells comprise the characteristic cells, the characteristic cells are scored and the plurality of interested images are selected according to scores of the characteristic cells, and wherein the characteristic cells are scored according to sizes and integrity of the characteristic cells.

6. The system for determining the characteristic cells based on image recognition according to claim 5, wherein the microscope scans the microslide and then employs the camera to obtain the full image of the microslide after adjusting a magnification.

7. The system for determining the characteristic cells based on image recognition according to claim 5, wherein the AI model determines whether the characteristic cells comprised by the plurality of stained cells are abnormal when the plurality of stained cells comprise the characteristic cells, and the AI model determines whether the plurality of stained cells in a next image comprise the characteristic cells when the plurality of stained cells do not comprise the characteristic cells.

* * * * *